Oct. 17, 1967     S. R. PETERSEN     3,348,127
SUPPORT ARRANGEMENT FOR DIODES IN A ROTATING RECTIFIER EXCITER
Filed Aug. 20, 1964     4 Sheets-Sheet 1
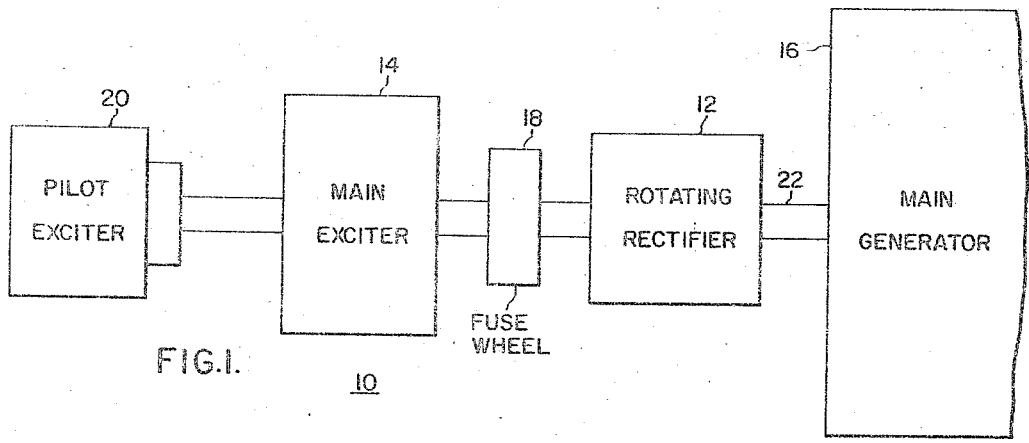
FIG.1.
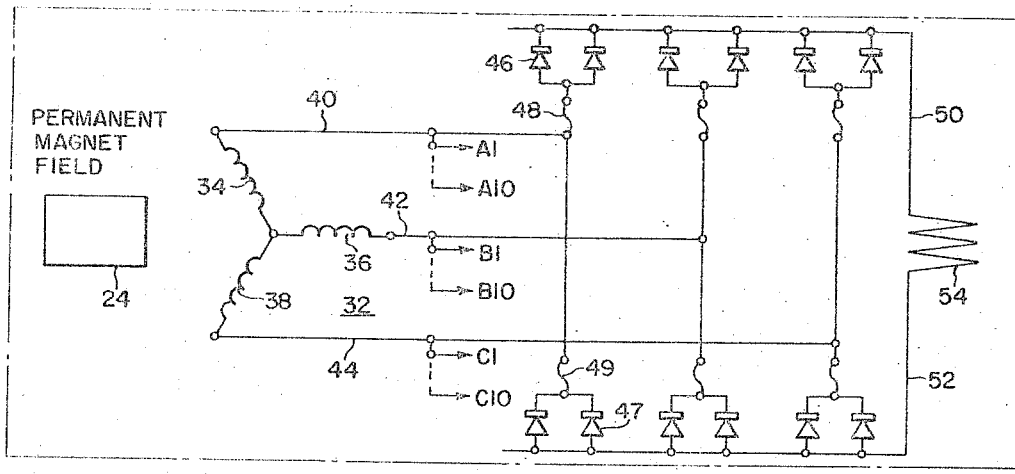
FIG.2.
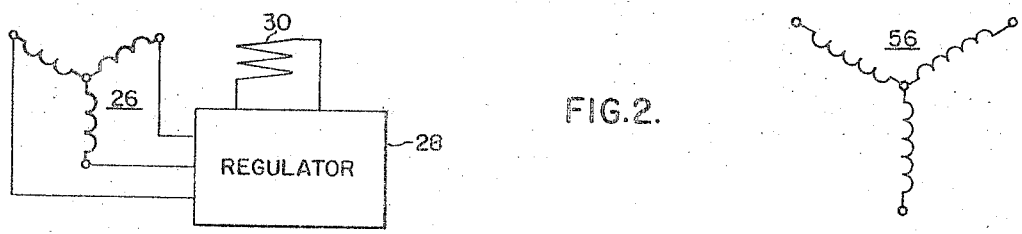
WITNESSES
Theodore F. Wrobel
Edward F. Possessky
INVENTOR
Sigrud R. Petersen
BY   *F. P. Lyle*
ATTORNEY

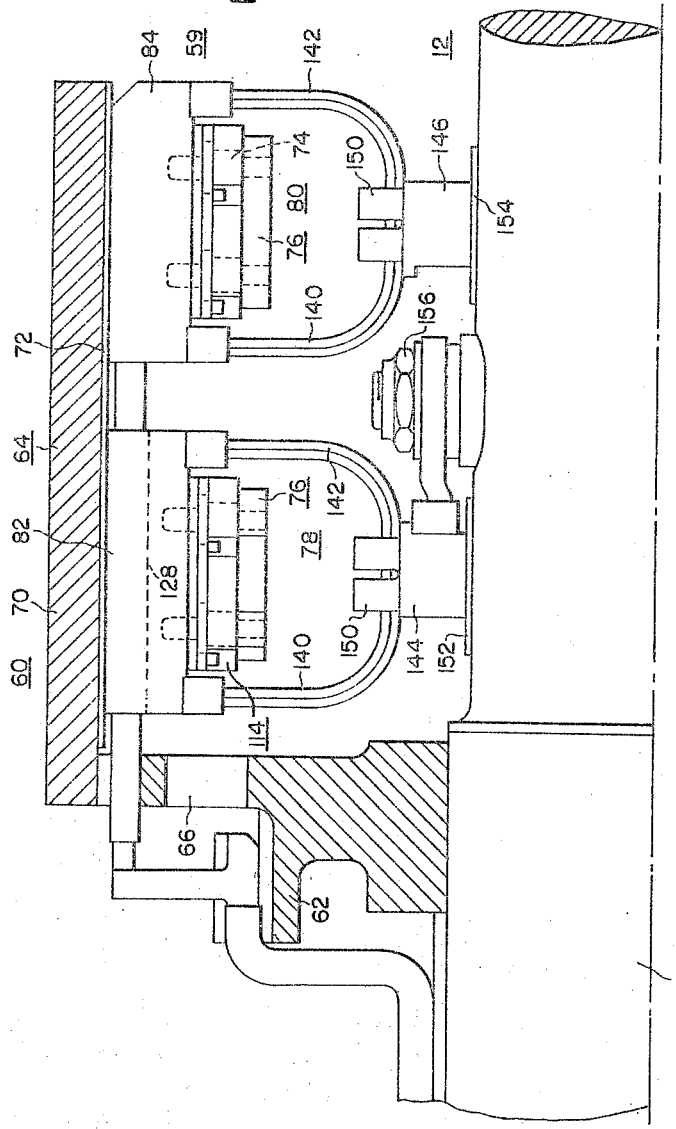
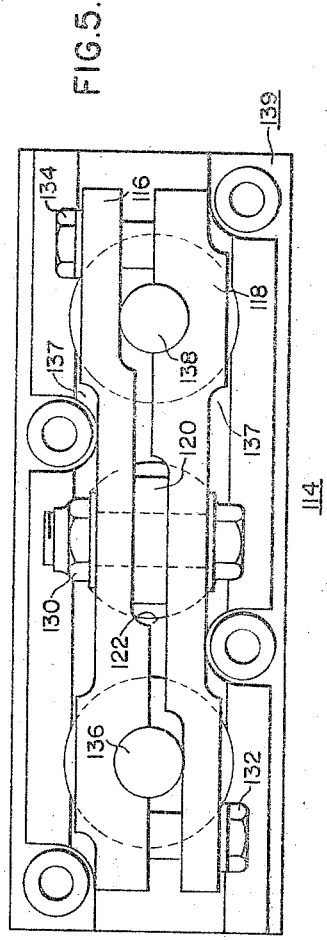

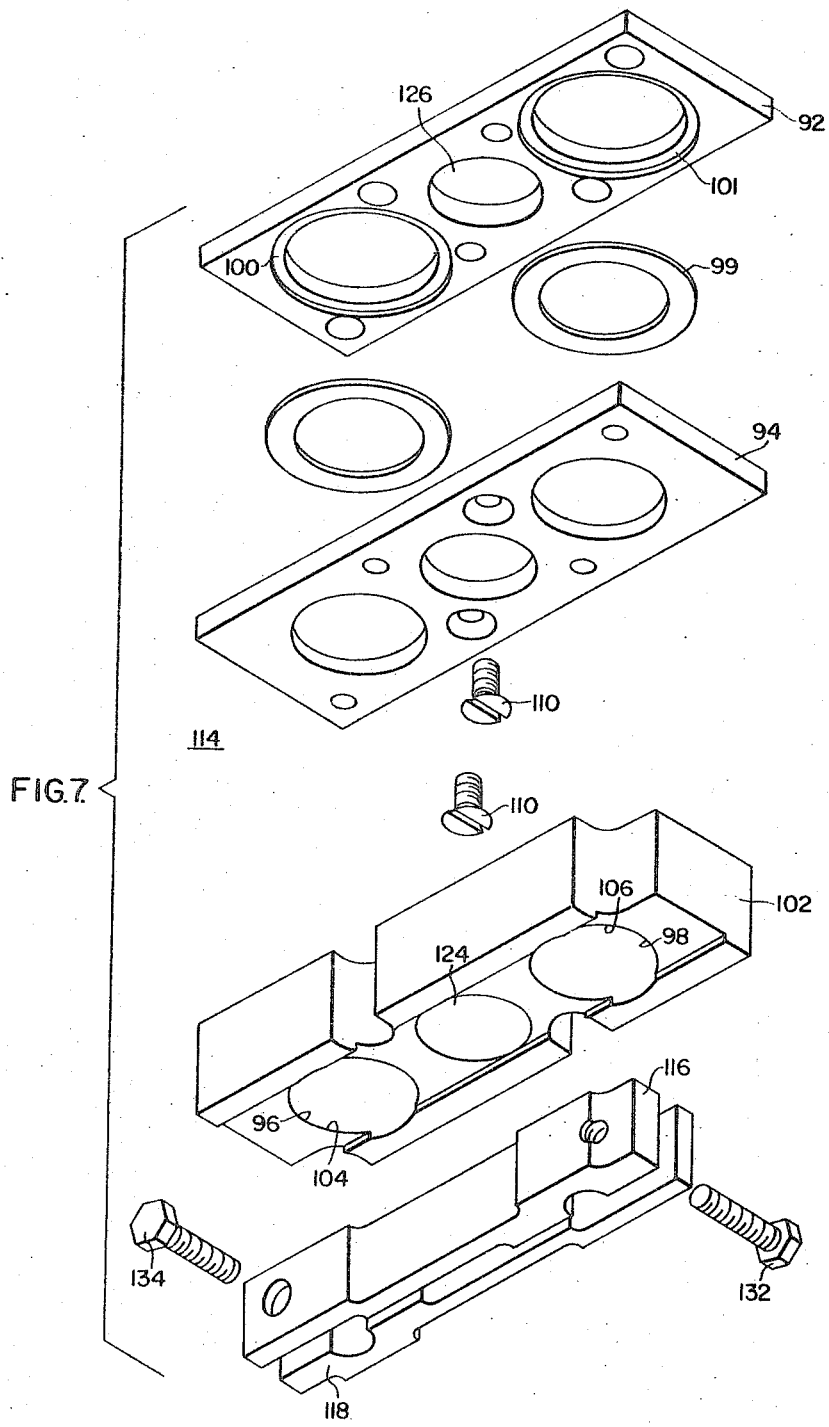

United States Patent Office 3,348,127
Patented Oct. 17, 1967

3,348,127
SUPPORT ARRANGEMENT FOR DIODES IN A
ROTATING RECTIFIER EXCITER
Sigrud R. Petersen, North Huntingdon Township, Pa.,
assignor to Westinghouse Electric Corporation, Pittsburgh, Pa., a corporation of Pennsylvania
Filed Aug. 20, 1964, Ser. No. 390,897
11 Claims. (Cl. 322—59)

The present invention relates to brushless AC power generating systems, and more particularly to supporting arrangements for diodes in rotating rectifier exciters which form a part of such systems.

In a rotating rectifier brushless generating system, a pilot exciter and a regulator provide controlled field energization for a main exciter, and a rotating armature of the main exciter in turn produces an alternating voltage which is applied to a rotating rectifier physically disposed with the main exciter armature on a common shaft. The rectified voltage is then applied to the main generator rotating field winding which is also disposed on the common shaft, and brushless delivery of generator excitation power (say up to 4000 kilowatts or more) is thereby achieved. Usually the pilot exciter has a permanent magnet field and is also driven by the common shaft, but a separate motor generator set can be used for pilot excitation. Efficiency and reliability are achieved through the elimination of maintenance and replacement problems normally associated with brushes, commutators and collector rings.

The rotating rectifier usually comprises a plurality of semiconductor diodes mounted on one or more shaft supported component or diode "wheels" and electrically interconnected in a suitable excitation circuit pattern between the main exciter and the main generator rotating field winding. In addition, separate fuses are usually provided in electrical series with the respective diodes, and physically the fuses can be disposed on one or more separate component or fuse "wheels" or they can be disposed with the diodes on one or more common component "wheels."

Component support and specifically diode support poses at least two principal problems. One of these arises from the need to support the diodes and associated leads in such a manner as to assure long term circuit operating reliability against the centrifugal forces of rotation which can be as much as or more than 6000 to 8000 times the force of gravity. The other principal problem arises in connection with space utilization. That is, the diodes and associated leads must be supported in such a manner as to provide "wiring" convenience around and along the common machine shaft through avoidance of excessive lead crowding and lead cross-over and the like. The latter problem generally becomes more critical as exciter current rating increases because more diodes are then required in the exciter circuit to carry the increased current. For simplicity, the term "wiring" will be used herein to refer to the establishment of various circuit connections even though the conductors employed may be strap members or similarly stiff members as opposed to ordinary flexible round wire.

In accordance with the principles of the present invention, an arrangement for supporting semiconductor diodes in a rotating rectifier exciter of a synchronous generator provides efficient diode and diode connecting means support against rotational forces while simultaneously providing efficient wiring space utilization. This arrangement comprises a component wheel secured to the machine shaft and having outer rim means on which the exciter diodes are circumferentially disposed to project radially inwardly from an inwardly facing surface thereof. The heat sink terminal of each diode is secured to the rim means or an insulatively separate heat sink portion thereof and the other or radially inmost terminal of each diode is provided with connecting means extending preferably generally laterally therefrom for electrical connection to the main exciter, or if the opposite is desired then for electrical connection to the main generator field winding. The radially inmost terminal of two or more diodes can also be commonly interconnected through the connecting means if desired.

The connecting means is supported against rotational forces by means of support structure engaging the connecting means and secured or supported in relation to the rim means. The same structure can also directly or indirectly provide diode side support. The support arrangement thus provides for reliable circuit operation and, since diode connections and support thereof are established in a generally outward radial region, efficient space utilization for wiring is provided as well.

It is therefore an object of this invention to provide a novel diode support arrangement in a rotating rectifier exciter wherein efficient wiring space utlization is achieved.

Another object of the invention is to provide a novel diode support arrangement in a rotating rectifier exciter wherein durable efficient support is provided for the diodes and for the diode connecting means.

A further object of the invention is to provide a novel diode support arrangement in a rotating rectifier exciter wherein a relatively large number of diodes can be supported in a given amount of space about the machine shaft without excessive conductor crowding or conductor cross-overs in the wiring or connecting scheme for the diodes.

A further object of the invention is to provide a novel diode support arrangement in a rotating rectifier exciter wherein two or more circumferential rows of diodes can be supported in spaced relation along the machine shaft axis on common wheel rim means while relative convenience is provided for establishing the diode wiring or connecting scheme.

Another object of the invention is to provide a novel diode support arrangement in a rotating rectifier exciter wherein diode connecting means support is efficiently achieved in a relatively outward radial position of a component or diode wheel.

These and other objects of the invention will become more apparent upon consideration of the following detailed description along with the attached drawings, in which:

FIGS. 1 and 2 respectively show mechanical and electrical schematic diagrams of a brushless synchronous generating system in which a rotating rectifier exciter is employed;

FIG. 3 shows a longitudinal section of a rotating rectifier portion of the system shown in FIG. 1 constructed in accordance with the principles of the invention;

FIGS. 5 and 6 show views of a diode support arrangement employed in the rotating rectifier portion and taken respectively along the reference lines V—V and VI—VI of FIG. 4; and FIG. 7 shows an exploded isometric view of the diode support arrangement of FIG. 4.

Figure 4:
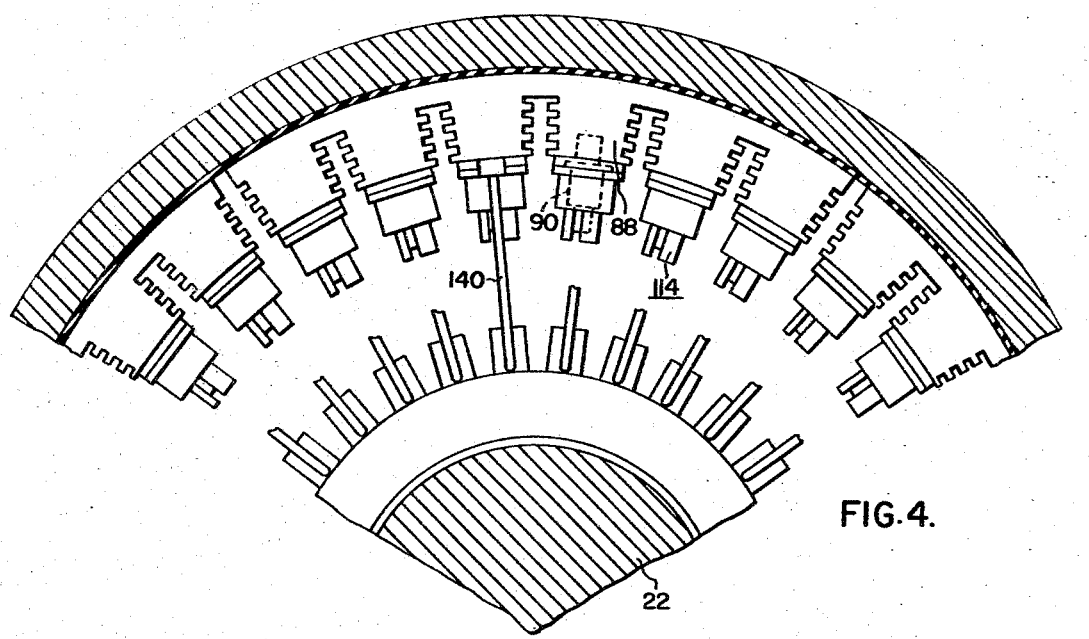
FIG. 4 is a portion of a cross-section of the rotating rectifier portion respectively taken along the reference line IV—IV of FIG. 3.

More specifically, there is shown schematically in FIG. 1 an AC power generating system 10 in which there is employed a rotating rectifier 12 and a main exciter 14 which provides field energization for a main generator 16 through the rotating rectifier 12. If desired, one or more separate fuse wheels 18 can be suitably disposed in the system 10 and interconnected between the main exciter 14 and the rotating rectifier 12 for the purpose of diode circuit protection. On the other hand, fuse components (not shown) can be secured in the rotating rectifier 12 without the use of the separate fuse wheel 18.

The main exciter 14 receives its field energization from a pilot exciter 20. Preferably, a mechanically common shaft 22 is provided for the power system 10, and when it is rotated by a suitable source of mechanical power the power system 10 is electrically self-started and self-sustained for power generation by means of the pilot and main exciters 20 and 14.

In the circuit schematic of FIG. 2, the shaft 22 is shown in dot-dash outline 22a so as to indicate clearly those electrical and magnetic components which undergo rotation. Thus, a permanent magnet field member 24 which can be of overhung construction (not shown) from the associated end of the shaft 22 is electromagnetically related to a stationary armature 26 of the pilot exciter 20 so that pilot voltage (usually AC) is applied to regulator 28 when the shaft 22 is rotated. If the overhung construction is employed for the permanent magnet field member 24, then the stationary armature 26 can be disposed within the field member 24 and generally in line with the axis of the shaft 22.

The regulator 28 is suitably organized to control the voltage (DC) applied to a stationary stator field 30 of the main exciter 14. This control is based in any well known manner upon main generator voltage and other feedback or other information. A main excitation circuit 31 thus includes a rotating armature 32 which is electromagnetically related to the DC field 30 of the main exciter 14, and in this instance the exciter armature 32 generates three-phase AC voltage in respective phase windings 34, 36 and 38 three wire Y connected, but other winding arrangements can be employed according to the voltage generating characteristics desired.

The electrical output of the armature windings 34, 36, and 38 is transmitted in the excitation circuit 31 through conductors 40, 42 and 44 (FIG. 2) respectively, through branches $A_1$–$A_{10}$ and $B_1$–$B_{10}$ and $C_1$–$C_{10}$, through feeder and "reverse polarity" return diodes 46 and 47 (only representatively shown) and associated fuses 48 and 49 (only representatively shown) which, in this case, are physically disposed in the fuse wheel 18. Rectified or DC voltage is thus applied through excitation circuit conductor 50 and return conductor 52 to the field winding 54 on the rotor of the main generator 16. Generated power voltage appears across a stationary armature 56 of the main generator 16.

The description so far presented has related to overall system structure and function and thus provides a perspective from which the present invention can be understood. It is apparent that the system 10 is a "brushless" system since there is no requirement for brushes, commutators, collector rings or the like. That is, rectification of the alternating current output of the main exciter is accomplished on the shaft 22 by means of diode components disposed in the rotating rectifier 12. As previously considered, however, the fact that the diode components are disposed in the rotating rectifier 12 presents two principal problems, namely that of space utilization for wiring and that of reliable support against the severe forces of rotation.

In FIG. 3, there is shown one embodiment of the rotating rectifier unit 12 in specific structural detail. Basically, it comprises a diode support arrangement 59 including a component wheel 60, and as previously considered the wheel 60 can be provided for any or all of the excitation circuit components or it can be provided for support only of the diode components of the excitation circuit. In this instance, the component wheel 60 is provided to support only the excitation circuit diode components and therefore is characterized as a diode wheel. Preferably, the diameter of the wheel 60 is kept as small as possible in order to minimize rotational energy losses and in addition in order to minimize rotational forces on the components supported by the wheel 60.

To support the wheel 60 relative to the shaft 22, there is provided a wheel hub 62 which can be an integral part of the wheel 60 but preferably is a separate wheel part which is suitably secured to the shaft 22, such as by shrink fitting, and on which there is suitably secured wheel rim means 64 (such as by shrink fitting). The wheel hub 62 is provided with a plurality of circumferentially spaced openings 66 for the purpose of obtaining ventilation within the wheel rim means 64, and in addition is provided with a plurality of conductor slots 68 (in this case sixty) about its outer periphery immediately adjacent to rim portion 70 of the wheel rim means 64.

The wheel rim portion 70 is provided with an inner generally cylindrical peripheral surface 72 relative to which a plurality of solid state or semiconductor diodes 74 (corresponding to diodes 46 and 47 of FIG. 2) are fixedly supported by support means 76. The rim portion inner periphery 72 thus provides solid support for the diodes 74 through the diode support means 76 against outward centrifugal force.

In this instance, there are provided two circumferential rows 78 and 80 of the diodes 74, and each diode row 78 or 80 includes a plurality of circumferentially spaced pairs of diodes 74 with each diode pair having the two diodes 74 spaced along the axial direction of the shaft 22. Further, there are provided a total of one hundred twenty diodes 74 with sixty diodes or thirty diode pairs provided in each row 78 or 80.

The wheel rim means 60 also include in this case respective heat sink means 82 and 84 which extend circumferentially about the inner wheel rim periphery 72 and which are spaced therefrom by means of a generally cylindrical layer 86 of suitable electrically insulative material. The heat sink means 82 and 84 can be secured to the wheel rim portion 70 and retained in electrically insulative relation thereto by suitable means such as bolts or the like (not shown) insulatively spaced from the heat sink means 82 and 84. When so disposed, the heat sink means 82 and 84 support the diode support means 76 and the semiconductor diodes 74 in relation to the wheel rim portion 70 and simultaneously provide for efficient heat transfer from the diodes 74. To form the necessary heat transfer paths, each heat sink means 82 or 84 thus includes a plurality (in this case five) of arcuate segments 83 (FIG. 4) of electrically and thermally conductive material (such as aluminum) preferably machined or otherwise formed to provide a heat sink 88 (FIG. 4) for each associated pair of diodes 74 in each diode row 78 or 80.

Figure 6:
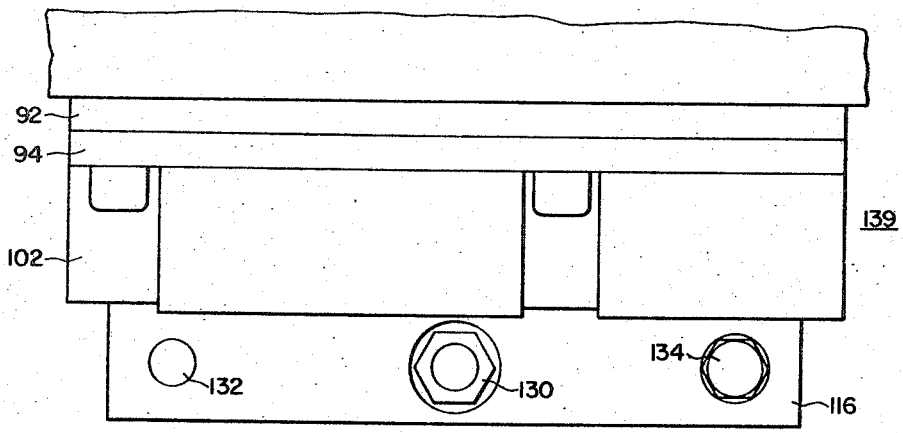

All of the semiconductor diodes 74 are supported identically by the diode support means 76 in relation to the associated heat sinks 88 or the wheel rim means 60. Therefore, as shown in greater detail in FIGS. 5–7, it will suffice to describe the manner in which only one of the associated pairs of diodes 74 is supported by the diode support means 76.

Each diode 74 can have its heat sink terminal 90 threadedly engaged with the associated heat sink 88 but in this case it is simply inserted into a suitable slot in the associated heat sink 88 and diode securance to the associated heat sink 88 as well as diode side support and diode connection means support are provided by the diode support means 76. For these purposes, the support means 76 includes plate means including an elongated connecting yoke 92 for establishing electrical and thermal conduction between the diode heat sink terminal 90 of each diode in the associated diode pair and the associated heat sink 88. The plate means further includes an elongated retainer yoke 94 which is provided with openings 96 and 98 to fit over the associated pair of diodes 74 against washers 99 which in turn fit tightly against flange 100 (FIG. 4) of the respective diode heat sink terminals 90 and thereby generally provide side support for the diode 74 and secure the diodes 74 against shoulders 101 of the contact yoke 92. Radially inwardly (relative to the machine shaft) of the retainer yoke 94, there is provided an elongated insulative block 102 which has openings 104 and 106 so as to fit over the diodes 74 in spaced relation therewith in this case. Securance of the entire support means 76 in relation to the rim means 60 or the associated heat sink 88 is provided by suitable means such as bolts 108 (FIG. 3) which extend along or through the insulative block 102, at least to provide support therefore against tangenital force and through the retainer plate 94 and the contact yoke 92. Preferably, the retainer and contact yokes 92 and 94 are sub-assembled with the diodes 74 by means of bolts 110, and the yokes 92 and 94 are secured in place by the bolts 108 and the block 102 is held against the plate 94 by connector clamping plates 116 and 118.

The diodes 74 in each diode pair are connected in electrical parallel by connecting means 114 extending from each diode 74 in the associated diode pair to terminal 112 (FIG. 3) through an associated hub slot 68. The terminal 112 in turn is suitably connected (not shown) to a fuse 48 as generally indicated in FIG. 2. The connecting means 114 includes respective radially inmost diode terminals 136 and 138 (FIG. 5) of the associated diodes 74 and the terminal clamping plates 116 and 118 which can be of identical construction but oppositely disposed so as to fit tightly into recess 137 in the radially inmost side 139 of the insulative blocks 102. In this manner, the block 102 provides side support for the diodes 74 through the clamping plates 116 and 118 against tangentially directed rotational forces which can become very large particularly when the main generator experiences a short circuit load condition.

The connecting means 114 further includes a relatively stiff suitably insulatively covered strap conductor 120 or 121 which extends radially outwardly from the clamping plates 116 and 118 through openings 122, 124 and 126 in the insulating block 102, the retainer yoke 94 and the contact yoke 92 respectively. The diode terminals 136 and 138 are in this case solid integral stud members of the diodes 74 and the plates 116 and 118 are secured thereto by suitable means such as nut and bolt means 132 and 134. In other applications of the invention the connecting means 114 can include different diode terminal structure such as flexible cable terminals provided as an integral part of the diode device.

In the diode row 78, the conductor 120 is bent substantially transversely through slot 128 in the associated heat sink 88 so as to extend to the terminal 112. For the diode row 80, the conductors 121 provided for the various diode pairs are necessarily somewhat longer than the conductors 120 provided for the diode row 78. Thus, the conductors 121 for the diode row 80 extend through slots 129 in the heat sink means 84 and can extend commonly with the conductors 120 for the diode row 78 through the slots 128 in the heat sink means 82 but separate slots can be provided in the heat sink means 82 for the conductors 121 of the diode row 80 if desired. Further, although the diode pairs in the diode row 80 can be staggered in relation to the circumferential position of the diode pairs in the diode row 78, it is preferred that they be aligned so as to facilitate common usage of the heat sink conductor slots or channels 128. Securance of the conductor 120 or 121 to the associated connecting means terminal plates 116 and 118 is provided by suitable means such as bolt and nut means 130.

One characteristic of the supporting scheme just described is that the connecting means for the diode terminals 136 and 138 generally extend radially outwardly from the radial position of the terminals 136 and 138 and thereby are more conveniently disposed in an outer radial region within the wheel rim portion 70 so as to provide efficient space utilization for wiring particularly where a large number of diodes are to be mounted within the component wheel 60 as in the present case. Further, although the connecting means does generally extend radially outwardly as described, efficient support is provided therefor against rotational forces. In particular, the connecting means portions or terminal plates 118 and 116 extend generally laterally away from the terminals 136 and 138 in the shaft axial direction and are solidly supported against radially outward movement by the insulating block 102 which thus serves as insulating means to support the diode terminal connecting means in relation to the wheel rim means 60 or the heat sink means 82 or 84. With such support, the terminal connecting means 116 and 118 are substantially prevented from imposing bending moments on the diode terminals 136 and 138 and, in combination with the side support generally provided indirectly by the insulating block 102 and the plate means 92, 94 for the diodes 74, there is thus generally provided reliable and durable diode and diode lead support against rotational forces.

The overall diode circuitry is completed by means of relatively stiff rod conductors 140 and 142 which are preferably somewhat stretchable in the machine radial direction and which extend from the arcuate segments 83 of the heat sink means 82 or 84 to respective positive and negative collector rings 144 and 146. The conductor rods 140 and 142 can be secured to the arcuate segments 83 by suitable slamp means 148 and to the collector rings 144 and 146 by suitable clamp means 150. Preferably in this instance the collector rings 144 and 146 are insulated from the machine shaft by suitable annular insulative rings 152 and 154.

In the heat sink means 82 or 84, the arcuate heat sink segments 83 can either be insulatively separated from each other or conductively connected to each other depending on the circuit pattern desired. In this case, some of the arcuate segments 83 are insulated from each other so as to provide for a three phase circuit pattern through the heat sink means 82 and 84. It is thus necessary that the conductors 140 and 142 extend from the heat sink means 82 or 84 to the collector rings 144 or 146 at least for each isolated arcuate arcuate heat sink segments 83, and otherwise preferably are circumferentially distributed about the collector rings 144 and 146 so as to provide sufficient total current flow cross section to meet the exciter current ratings. From the collector rings 144 and 146, suitable connection is made through stud means 156 and another stud means (not shown) to the interior of the shaft 22 where positive and negative conductors (see schematic conductors 50 and 52 in FIG. 2) are extended axially to the main generator for connection respectively to the positive and negative ends of the rotor field winding of the generator.

In brief summary of the invention, the diodes 74 are solidly supported against rotational forces. Such support is advantageously provided in a comparatively outward radial position by wheel rim means and diode support means. Radially inmost diode connecting or "lead" means are also efficiently supported against rotational forces by the diode support means in relation to the wheel rim means such that the diode connecting means can be extended generally radially outwardly from the diode radial position where convenient and efficient space utilization is provided for establishing the diode circuit connection pattern. This pattern can vary according to the designer's preference or needs, and the support means described can have utility in systems having different exciter winding, generator field winding, fuse, and other circuit component arrangements from that described herein.

The foregoing disclosure has been presented only to illustrate the principles of the invention. Accordingly, it is desired that the invention be not limited by the embodiments described, but, rather, that it be accorded an interpretation consistent with the scope and spirit of its broad principles.

What is claimed is:

1. In a rotating rectifier exciter for a brushless AC generating system, a diode support arrangement comprising a component wheel having a hub mounted on a shaft, said wheel having rim means, a plurality of semiconductor diodes disposed about an inwardly facing peripheral surface of said rim means and radially extending between said rim means and said shaft, each of said diodes having a heat sink terminal supported in a portion of said rim means, each of said diodes having further terminal means extending therefrom at a point radially inwardly from the diode heat sink terminal, further support means secured to said rim means and surrounding each of said diodes, electrical connecting means secured to said inwardly extending diode terminal means, said support means supporting the connecting means and the associated diode against radially outward force, and means for connecting said connecting means to another portion of an excitation circuit in said system.

2. A diode support arrangement as set forth in claim 1 wherein said support means is formed from insulative material.

3. In a rotating rectifier exciter for a brushless AC generating system, a diode support arrangement comprising a component wheel having a hub mounted on a shaft, said wheel having a rim portion, heat sink means disposed on an inwardly facing peripheral surface of said wheel rim portion and radially extending between said portion and said shaft, a plurality of semiconductor diodes disposed circumferentially about said rim portion and inwardly thereof on said heat sink means, each of said diodes having a heat sink terminal secured to a portion of said heat sink means, each of said diodes having further terminal and connecting means extending therefrom at a point radially inwardly from the diode heat sink terminal, insulative support means secured to said heat sink means and surrounding each of said diodes, said connecting means and said diodes supportingly engaged by said support means in proximity to the associated diode against radially outward force, said connecting means having a portion thereof extending generally radially outwardly for excitation circuit connection in said system, and means for connecting said heat sink means in the excitation circuit of said system.

4. A diode support arrangement as set forth in claim 3 wherein said insulative support means include an insulative block disposed about each of said diodes and having a radially inner surface for supporting said connecting means as described.

5. A diode support arrangement as set forth in claim 3 wherein slot means are provided in said heat sink means for extension of at least a section of each of said connecting means portions.

6. In a rotating rectifier exciter for a brushless AC generating system, a diode support arrangement comprising a component wheel having a hub mounted on a shaft, said wheel having rim means, a plurality of semi-conductor diodes disposed about an inwardly facing peripheral surface of said rim means, each of said diodes having a heat sink terminal secured to a portion of said rim means, each of said diodes having connecting means extending therefrom at a point radially inwardly from the diode heat sink terminal, said diodes arranged in pairs spaced about said rim means radially inner surface periphery, said connecting means for each diode pair including common terminal clamp means extending between respective terminal studs of the paired diodes, support means secured to said rim means and disposed around said diode pairs, said terminal clamp means supportedly engaged by said support means in proximity to the associated diode pairs against radially outward force and disposed around said diode pairs, and a conductor clamped to said common terminal clamp means and extending generally radially outwardly for excitation circuit connection in said system.

7. In a rotating rectifier exciter for a brushless AC generating system, a diode support arrangement comprising a component wheel having a hub mounted on a shaft, said wheel having a rim portion, heat sink means supported on an inwardly facing peripheral surface of said rim portion, a plurality of semiconductor diodes disposed peripherally about said rim portion and inwardly thereof of said heat sink means, each of said diodes having a heat sink terminal secured to a portion of said heat sink means, each of said diodes having connecting means extending therefrom at a point radially inwardly from the diode heat sink terminal, said diodes arranged in pairs spaced peripherally about said heat sink means and said rim portion, said connecting means for each diode pair including common terminal clamp means extending between respective terminal studs of the paired diodes, support means secured to said heat sink means and disposed around said diode pairs, said terminal clamp means supportingly engaged by said support means, said connecting means further including a conductor clamped to said terminal clamp means and extending generally radially outwardly for excitation circuit connection in said system, means for connecting said heat sink means in the excitation circuit of said system, and slot means in said heat sink means for accommodating said conductors of the respective diode pair connecting means.

8. A diode support arrangement as set forth in claim 6, wherein plate means clamp each of said diode pairs to said rim means, and said support means include an insulative block disposed over each of said diode pairs and the associated plate means and secured to said rim means to clamp said plate means as described, each of said blocks having a radially inmost side having a recess therein, said terminal clamp means supported by the associated blocks in said recess against radially outward force and against tangentially directed force.

9. A diode support arrangement as set forth in claim 6 wherein said rim means include a rim portion and respective heat sink means disposed radially inwardly of and peripherally about said rim portion, said respective heat sink means spaced in the axial direction, said diodes are arranged in pairs and supported on each of said heat sink means, and means provided for extending the respective conductors from the respective terminal clamp means for each diode pair through the heat sink means for connection in the system excitation circuit.

10. In a rotating rectifier exciter for a brushless AC generating system, a diode support arrangement comprising a component wheel having rim means, means for radially supporting at least one diode on an inwardly facing surface of said rim means, said diode having a heat sink terminal, said diode having further terminal means extending therefrom at a point radially inwardly from the diode heat sink terminal, electrical connecting means secured to said inwardly extending diode terminal means, and insulating means secured to said rim means and supportedly engaging said connecting means and said diode in proximity to said diode against radially outward force.

11. A diode support arrangement as set forth in claim 10 wherein said insulating means include an insulating block disposed over said diode to provide side support therefor and having a radially inner surface supporting said connecting means as described.

References Cited

UNITED STATES PATENTS

| | | | |
|---|---|---|---|
| 2,972,711 | 2/1961 | Sorokin et al. | 317—234 |
| 3,059,168 | 10/1962 | Sones et al. | 322—59 |
| 3,078,409 | 2/1963 | Bertsche et al. | 317—234 |
| 3,146,362 | 8/1964 | Bates et al. | 310—68 |
| 3,160,771 | 12/1964 | Martin et al. | 310—68 |
| 3,196,317 | 7/1965 | Potter et al. | 317—234 X |
| 3,198,972 | 8/1965 | Larson | 310—68 |

MILTON O. HIRSHFIELD, *Primary Examiner.*

J. J. SWARTZ, R. V. LUPO, *Assistant Examiners.*